(12) United States Patent
Kellendonk et al.

(10) Patent No.: US 6,205,011 B1
(45) Date of Patent: Mar. 20, 2001

(54) SWITCHED-MODE REGULATOR FOR AN ELECTROMAGNET

(75) Inventors: Peter Kellendonk, Cologne; Hans-Michael Schuster, Haan, both of (DE)

(73) Assignee: Ultrafilter GmbH, Haan (DE)

( * ) Notice: Subject to any disclaimer, the term of this patent is extended or adjusted under 35 U.S.C. 154(b) by 0 days.

(21) Appl. No.: 09/194,353

(22) PCT Filed: May 27, 1997

(86) PCT No.: PCT/EP97/02739

§ 371 Date: Nov. 24, 1998

§ 102(e) Date: Nov. 24, 1998

(87) PCT Pub. No.: WO97/45846

PCT Pub. Date: Dec. 4, 1997

(30) Foreign Application Priority Data

May 29, 1996 (DE) ............................... 196 21 486

(51) Int. Cl.⁷ ..................................................... H01H 47/00
(52) U.S. Cl. .................................................. 361/139
(58) Field of Search ............................... 361/18, 139, 152, 361/160; 323/222, 232, 233, 282

(56) References Cited

U.S. PATENT DOCUMENTS 4,454,558 * 6/1984 Huddart ................................ 361/153

FOREIGN PATENT DOCUMENTS

| 2 538 942 | 7/1984 | (FR) | ................................. | H01F/7/18 |
| 2 103 436 | 2/1983 | (GB) | ............................ | H02M/3/155 |

* cited by examiner

*Primary Examiner*—Ronald W. Leja
(74) *Attorney, Agent, or Firm*—Merchant & Gould P.C.

(57) ABSTRACT

In a switched-mode regulator for operation of an electromagnet having a magnet coil using different supply voltages the operating voltage $U_B$ of the electromagnet is produced by means of a storage circuit including a storage choke (2). To achieve cost and space-saving operation of the electromagnet using different supply voltages $U_V$, the storage choke also acts as the magnet coil of the electromagnet.

10 Claims, 1 Drawing Sheet

SWITCHED-MODE REGULATOR FOR AN ELECTROMAGNET

TECHNICAL FIELD

The invention relates to a switched-mode regulator having a storage choke, momentary-contact switch, an electromagnet including a magnet coil and electronic control means for operation of the electromagnet at a predetermined operating voltage using different supply voltages, said operating voltage being produced using a storage choke lying at the supply voltage in a storage circuit, said storage circuit having associated with of a measured-value sensor connected to electronic control means associated with the momentary-contact switch.

STATE OF THE ART

The term "electromagnet" also includes any device having a magnetic coil comparable to such a magnet, such devices include, for example, magnetic valves, contactors, electromechanical controls, for example elevator doors, and electromagnetic actuators. Switched-mode regulators are used, for example, to control electronic condensate diverters. In principle a condensate diverter is a device which detects the level of a condensate collected in a container and empties the container by actuation of a magnetic valve when a predetermined level is exceeded. The magnetic valve is opened or closed by activation of an electromagnet.

The technique described leads to problems in logistics when a transformer is used, since each voltage range requires its own variant of the apparatus; besides this a considerable outlay in expense and space is required both for the transformer and for the switched-mode regulator and storage choke.

THE INVENTION

The object of the invention is to provide a circuit, particularly for a condensate diverter, which permits cost and space-saving operation of an electromagnet using different supply voltages and at the same time makes it possible to produce the supply voltage for an electronic control unit.

To this end, in accordance with the invention, in the switched-mode regulator described above the storage choke also serves as the magnet coil of the electromagnet.

An important feature of the invention consists in the double function of the one coil, namely in the use of the magnet coil of the electromagnet also as the storage choke of a switched-mode regulator associated with the electromagnet. Accordingly—particularly when the electromagnet is energised—the coil performs the two functions simultaneously. Thus in accordance with the invention the magnet coil of the electromagnet, which really only needs to be supplied with voltage, is also momentarily used as a control means for producing a predetermined operating voltage from supply voltages of different magnitudes, i.e. in the end to produce a separate voltage of predetermined magnitude.

If the operation of the switched-mode regulator uses relatively little power in the production of a predetermined operating voltage, compared with the requirements of an electromagnet, it may be advantageous, when operating the storage choke as the magnet coil of the electromagnet, to place at least one additional resistance at the operating voltage. This can be supplied through the storage choke and can be connected in series with the choke and optionally in parallel with a load to which the operating voltage is applied. The size of this additional resistance should in principle be inversely proportional to the power requirement of the electromagnet. In other words, the additional resistance is provided in order to increase the amount of energy in the storage choke so that the electromagnet attracts with the desired force.

The technique described leads to problems in logistics when a transformer is used, since each voltage range requires its own variant of the apparatus; besides this a considerable outlay in expense and space is required both for the transformer and for the switched-mode regulator and storage choke.

THE INVENTION

The object of the invention is to provide a circuit, particularly for a condensate diverter, which permits cost- and space-saving operation of an electromagnet using different supply voltages and at the same time makes it possible to produce the supply voltage for an electronic control unit.

To this end, in accordance with the invention, in the switched-mode regulator described above the storage choke also serves as the magnet coil of the electromagnet.

An important feature of the invention consists in the double function of the one coil, namely in the use of the magnet coil of the electromagnet also as the storage choke of a switched-mode regulator associated with the electromagnet. Accordingly—particularly when the electromagnet is energised—the coil performs the two functions simultaneously. Thus in accordance with the invention the magnet coil of the electromagnet, which really only needs to be supplied with voltage, is also momentarily used as a control means for producing a predetermined operating voltage from supply voltages of different magnitudes, i.e. in the end to produce a separate voltage of predetermined magnitude.

Accordingly it is advantageous to associate with the storage circuit of the storage choke not only a measured-value sensor detecting the amount of energy contained in the storage choke but also the associated electronic control means for controlling the momentary-contact switch. Through this combination, preferably integration, the electronic control means is only subjected to the applied voltage or the energy supply itself loaded insofar as it is momentarily doing work for actuation of the momentary-contact switch. The position of the electronic control means at the constant operating voltage is particularly advantageous if in addition the storage choke also acts as the magnet coil.

An important application of the invention is to electronic condensate diverters or switched-mode regulators for electronic condensate diverters. In the case of supply through a switched-mode regulator the measuring electronics of the condensate diverter are at the constant output voltage operating voltage delivered by the switched-mode regulator. The condensate diverter also includes a magnet coil for operation of a magnetic valve. This opens when a condensate in a container, the level of which is detected by the measuring electronics, exceeds a predetermined level. For actuation of the magnetic valve a magnet coil is used which, when supplied through a switched-mode regulator, can likewise be at the controlled constant operating voltage. In this connection the invention consists not only in the measuring electronics being connected across the terminals of the constant controlled operating voltage, but also in the storage choke—in its double function in accordance with the invention—serving as the magnet coil of the magnetic valve belonging to the condensate diverter and controlled through the measuring electronics. The invention enables corresponding integration of the magnetic valve or of its magnet coil into the circuit of the switched-mode regulator, so that the magnetic valve takes over the function both of the storage choke in the switching circuit part of the switched-mode regulator and also that of the magnet coil of the magnetic valve in the control unit as a whole.

BRIEF DESCRIPTION OF THE DRAWINGS

The invention will now be described in more detail, by way of example, with reference to embodiments shown in the drawings, in which.

MODES OF CARRYING OUT THE INVENTION

Figure 1:
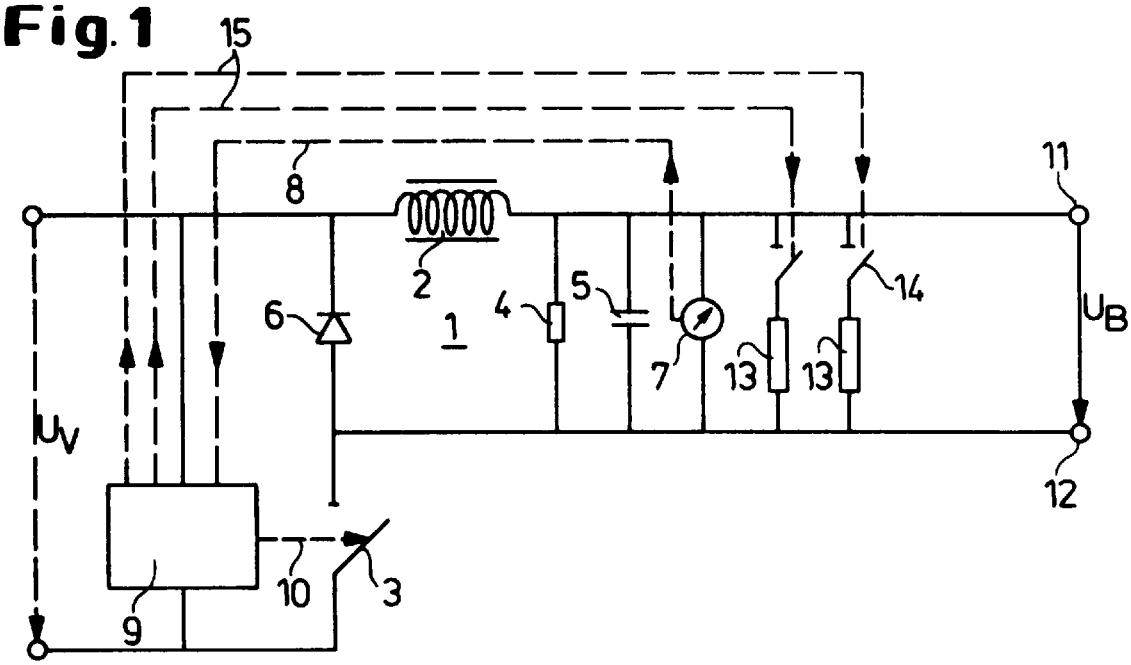
FIG. 1 shows a switched-mode regulator in which a magnet coil of an electromagnet is acting as storage choke.

By means of the circuit a substantially constant operating voltage $U_B$ is produced from a supply voltage $U_V$ which varies from case to case. The heart of the circuit for producing the approximately constant operating voltage $U_B$ is a storage circuit 1 of which the most important element is a storage choke 2. When the momentary-contact switch 3 is closed the storage choke 2 is subjected to the supply voltage $U_V$ through a resistor 4 and a capacitor 5, which in each case may be stray conductivities or capacities. In the storage circuit 1 there is also a rectifier 6. When the storage choke 2 has taken up the maximum or desired amount of energy, the switch 3 opens. The current through the storage choke then continues to flow until the amount of energy contained in the storage choke 2 falls below a predetermined value at which the switch 3 closes again.

There are various means of opening and closing the switch 3 in dependence on the amount of energy contained in the storage choke 2; these may be mechanical, electronic or integrated, for example in semiconductor devices. In principle the energy contained in the storage choke 2 is detected by means of a measured-vale sensor 7. The measured-vale sensor shown in FIG. 1 gives a signal via a lead 8 to an electronic control unit 9—as shown in FIG. 1 this lies at the supply voltage $U_V$—and the electronic control means 8(sic) actuates the switch 3 through the operating line 10.

In the previous practice an electromagnet, in particular of a condensate diverter, can be connected between the terminals 11, 12 of the operating voltage $U_B$. In accordance with the invention the storage choke 2 which is in any case present in the circuit can be used and formed alternatively as a magnet coil. Hence the storage choke 2 should be equipped with an iron core, at least for the case of use as a magnet coil.

When the power consumption of the magnet coil of the electromagnet is substantially higher than that of the storage choke 2 of the switched-mode regulator, at least one additional resistor 13 and switch 14 supplied through the storage choke 2 or lying at the operating voltage is added. The switch 14 of a respective additional resistor 13 can for example be arbitrarily switched on or off from outside, by changing over the function of the storage choke 2 to operation as the magnet coil of an electromagnet or by the electronic control means 9, for example through leads 15.

Switching on the respective electromagnet often costs much more energy up to the energising of the electromagnet than in the later holding operation of the electromagnet. Hence it can be advantageous to use two or more additional resistors 13 with corresponding switches 14 and/or to form the additional resistor 13 as a variable resistor—preferably likewise with independent control, e.g. through the electronic control means 9.

INDUSTRIAL APPLICATION

Figure 2:
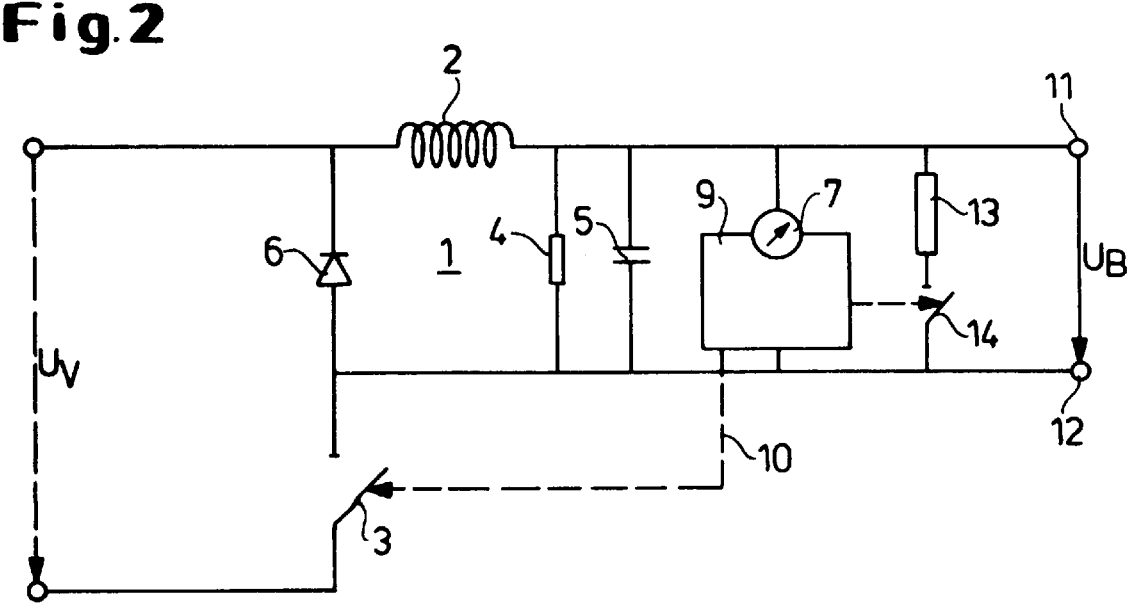
FIG. 2 shows a switched-mode regulator whose own electronic control means are also at the constant operating voltage produced by the storage choke in the storage circuit.

A particular alternative to FIG. 1 is shown in the circuit of FIG. 2. In this case the electronic control means 9 is connected not to the control voltage $U_V$, which is often different, but to the operating voltage $U_B$ which it keeps constant itself. In the embodiment shown in FIG. 2 the electronic control means 9 is connected in series with the measured-value sensor 7 at the constant operating voltage $U_B$. Otherwise the electronic control means 9 acts to operate the circuit in a way quite similar to that shown in FIG. 1, so that the operating lines 10, 15 in FIG. 2 have the same meaning. The components 2 to 6 are in principle the same as those in FIG. 1. Also in the embodiment shown in FIG. 2 it can be advantageous to form the storage choke 2 at the same time or alternatively as the magnet coil of an electromagnet connected at the constant controlled operating voltage $U_B$.

What is claimed is:

1. A switched-mode regulator having a storage choke (2), a momentary-contact switch (3), an electromagnet which includes a magnet coil, and an electronic control means (9) for operating this electromagnet having the magnet coil at a predetermined constant controlled operating voltage ($U_B$) using different supply voltages ($U_V$), said operating voltage being produced using said storage choke (2) connecting to a supply voltage in a storage circuit (1), said storage circuit having associated with it a sensor (7) connected to said electronic control means (9) which in turn controls the momentary-contact switch (3), wherein the storage choke (2) of said switched-mode regulator includes the magnet coil that also operates as the magnet coil of the electromagnet.

2. A switched-mode regulator as claimed in claim 1, when the storage choke (2) is operating as the magnet coil, at least one additional resistor (13) is added and connected to the constant controlled operating voltage ($U_B$) through the storage choke (2).

3. A switched-mode regulator as claimed in claim 2, wherein the additional resistor (13) can be adapted variably and independently to the needs of a switching-on current and a holding current of the electromagnet.

4. A switch-mode regulator as claimed in claim 2, wherein the additional resistor (13) is variable and can be controlled by a device which is connected to the operating voltage.

5. A switched-mode regulator as claimed in claim 2, wherein the additional resistor (13) is connected to the operating voltage ($U_B$) through a switch (14).

6. A switched-mode regulator as claimed in claim 5, wherein the switch (14) can be actuated through the electronic control means (9), when the storage choke (2) is used as the magnet coil of the electromagnet.

7. A switched-mode regulator as claimed in claim 1, wherein the electronic control means (9) is connected to the constant controlled operating voltage ($U_B$) with the sensor (7).

8. A switched-mode regulator as claimed in claim 1, wherein the electronic control means is supplied through the storage choke or is connected to the constant controlled operating voltage ($U_B$).

9. A switched-mode regulator as claimed in claim 1, wherein the electronic control means (9) and the sensor are integrated in one component.

10. A switched-mode regulator as claimed in claim 1, wherein measuring electronics of a condensate diverter are connected to the terminals (11, 12) of the constant controlled operating voltage ($U_B$) and that the storage choke (2) is the magnet coil of the magnet valve belonging to the condensate diverter and controlled by the measuring electronics.

* * * * *

UNITED STATES PATENT AND TRADEMARK OFFICE
CERTIFICATE OF CORRECTION

PATENT NO. : 6,205,011 B1 Page 1 of 1
DATED : March 20, 2001
INVENTOR(S) : Kellendonk et al.

It is certified that error appears in the above-identified patent and that said Letters Patent is hereby corrected as shown below:

Title page,
Item [56], References Cited, under OTHER PUBLICATIONS, insert
-- Patent Abstract of Japan, vol. 011, no. 338 (E-553), November 5, 1987, and JP 62 12006 A (Ricoh Co. Ltd.) June 1, 1987 --

Column 4,
Line 38, insert -- wherein -- before "when"

Signed and Sealed this

Twentieth Day of August, 2002

*Attest:*

*Attesting Officer*

JAMES E. ROGAN
*Director of the United States Patent and Trademark Office*